United States Patent
Townend et al.

(10) Patent No.: US 11,751,080 B2
(45) Date of Patent: Sep. 5, 2023

(54) WIRELESS NETWORK ACCESS POINT AND METHOD FOR OPERATION THEREOF

(71) Applicant: British Telecommunications Public Limited Company, London (GB)

(72) Inventors: David Townend, London (GB); Francis Scahill, London (GB); Simon Ringland, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 17/787,155

(22) PCT Filed: Dec. 18, 2020

(86) PCT No.: PCT/EP2020/087313
§ 371 (c)(1),
(2) Date: Jun. 17, 2022

(87) PCT Pub. No.: WO2021/123376
PCT Pub. Date: Jun. 24, 2021

(65) Prior Publication Data
US 2023/0033489 A1 Feb. 2, 2023

(30) Foreign Application Priority Data

Dec. 19, 2019 (EP) .................................... 19218317
Dec. 19, 2019 (GB) .................................... 1918903

(51) Int. Cl.
*H04W 24/08* (2009.01)
*H04L 1/20* (2006.01)
*H04W 60/04* (2009.01)

(52) U.S. Cl.
CPC ............. *H04W 24/08* (2013.01); *H04L 1/203* (2013.01); *H04W 60/04* (2013.01)

(58) Field of Classification Search
CPC ........ H04W 24/08; H04W 60/04; H04L 1/203
(Continued)

(56) References Cited

U.S. PATENT DOCUMENTS 9,794,156 B2 * 10/2017 Ma ...................... H04L 25/0242
9,825,838 B2 * 11/2017 Ma .......................... H04L 7/042
(Continued)

FOREIGN PATENT DOCUMENTS

CN        101388841 A      3/2009
CN        103259618 A      8/2013
(Continued)

OTHER PUBLICATIONS

Combined Search and Examination Report under Sections 17 and 18(3) for Great Britain Application No. 1918903.4, dated Sep. 18, 2020, 11 pages.
(Continued)

*Primary Examiner* — Mong-Thuy T Tran
(74) *Attorney, Agent, or Firm* — Patterson Thuente, P.A.

(57) ABSTRACT

The present disclosure relates to a computer-implemented method of operating a wireless network access point of a wireless network. The method includes wirelessly exchanging management frames with a device to attach the device to the access point, thereby establishing: a wireless downlink data communication channel from the access point to the device, and a wireless uplink data communication channel from the device to the access point. The method further includes performing a wireless link test comprising: transmitting a test frame to the device on the downlink channel, the test frame having a length greater than each of the management frames, including a sequence of test data bits, and being configured to require a mirror response comprising the sequence of test data bits; monitoring for receipt of (Continued)

the mirror response on the uplink; and, if the mirror response is received, determining the test is passed.

14 Claims, 10 Drawing Sheets

(58) Field of Classification Search
    USPC .......................................................... 370/329
    See application file for complete search history.

(56) References Cited

U.S. PATENT DOCUMENTS

| | | | |
|---|---|---|---|
| 10,194,436 B2 | 1/2019 | Bharadwaj et al. | |
| 2003/0161341 A1 | 8/2003 | Wu et al. | |
| 2005/0261860 A1 | 11/2005 | Lobig | |
| 2006/0135066 A1* | 6/2006 | Banerjea | H04B 17/24 |
| | | | 455/41.2 |
| 2012/0140756 A1 | 6/2012 | Rudolf et al. | |
| 2013/0215776 A1 | 8/2013 | Verpooten | |
| 2015/0051872 A1 | 2/2015 | Arora et al. | |
| 2016/0021680 A1 | 1/2016 | Choi et al. | |
| 2017/0181059 A1* | 6/2017 | Townend | H04W 24/06 |
| 2018/0310229 A1 | 10/2018 | Li et al. | |

FOREIGN PATENT DOCUMENTS

| | | | |
|---|---|---|---|
| CN | 103517379 A | 1/2014 | |
| CN | 109640387 A | 4/2019 | |
| EP | 2632071 A1 | 8/2013 | |
| KR | 20110118700 A * | 10/2011 | ........ H04W 72/0453 |
| KR | 20170030759 A | 3/2017 | |
| WO | WO 2004/006504 A1 | 1/2004 | |
| WO | WO-2004006504 A1 * | 1/2004 | ......... H04L 41/5087 |
| WO | WO-2008008990 A2 | 1/2008 | |
| WO | WO-2015145169 A1 | 10/2015 | |
| WO | WO-2016053024 A1 | 4/2016 | |

OTHER PUBLICATIONS

Extended European Search Report for Application No. 19218317.6, dated May 27, 2020, 10 pages.
Extended European Search Report for Application No. EP14250056. 0, dated Sep. 26, 2014, 8 pages.
IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications, IEEE Std 802.11, Jun. 12, 2007, 1233 Pages.
IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications, IEEE Std 802.11, 2016, 3534 Pages.
IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications, IEEE Std 802.11k, Jun. 12, 2008, 244 Pages.
International Preliminary Report on Patentability for Application No. PCT/GB2015/050930, dated Oct. 13, 2016, 8 pages.
International Search Report and Written Opinion for Application No. PCT/EP2020/087313, dated Mar. 10, 2021, 11 pages.
Mu M. et al., "Measuring Wireless Network Connection Quality," Jan. 27, 2016, Technical Disclosure Commons, Jan. 27, 2016, Retrieved from the Internet: http://www.tdcommons.org/dpubs_series/127, 12 pages.
Office Action dated Apr. 15, 2019 for European Application No. 15713804.1, 5 pages.
Polanec C., et al., 802.11 TGe—QoS Enhancements (D6.0), Wireless LAN Consortium, 32 pages.
Sauter M., "Wireless Local Area Network (WLAN) in: Communication Systems for the Mobile information Society," John Wiley & Sons, Ltd, Chichester, UK, XP055140319, DoI: 10.1092/9780470933210, Jul. 14, 2006, pp. 217-248.
Gast, Matthew, "802.11® Wireless Networks: the Definitive Guide", ISBN: 0-596-00183-5, Apr. 2002, 464 pgs.
Non-Final Office Action Received in U.S. Appl. No. 15/300,156, dated Apr. 19, 2019, 8pgs.
Final Office Action received in U.S. Appl. No. 15/300,156, dated Sep. 28, 2018, 9pgs.
Non-Final Office Action received in U.S. Appl. No. 15/300,156, dated Jan. 12, 2018, 8 pgs.
International Preliminary Report on Patentability for Application No. PCT/EP2020/087313, dated Jun. 30, 2022, 8 pages.

* cited by examiner

| Device ID | Frame Size (bytes) | Mirrored? |
|---|---|---|
| 8C:2D:AA:0D:C5:14 | 14 | Y |
| | 100 | Y |
| | 500 | Y |
| | 1500 | N |
| | 7500 | N |
| 8C:2D:AA:0D:C5:15 | 14 | Y |
| | 100 | Y |
| | 500 | Y |
| | 1500 | Y |
| | 7500 | Y |

Figure 3

| Internet Access Approvals |
|---|
| 8C:2D:AA:0D:C5:15 |
| |
| |
| |

Figure 4

WIRELESS NETWORK ACCESS POINT AND METHOD FOR OPERATION THEREOF

PRIORITY CLAIM

The present application is a National Phase entry of PCT Application No. PCT/EP2020/087313, filed Dec. 18, 2020, which claims priority from EP Patent Application No. 19218317.6, filed Dec. 19, 2019 and GB Patent Application No. 1918903.4, filed Dec. 19, 2019, each which is hereby fully incorporated herein by reference.

TECHNICAL FIELD

The present disclosure relates to wireless network access. More specifically, aspects of the present disclosure relate to a computer-implemented method of operating a wireless network access point of a wireless network, an access point configured to perform such a method and a system comprising such an access point and a wireless device. Further aspects relate to a computer program comprising instructions which, when the program is executed by a computer, cause the computer to carry out the method, a computer-readable data carrier having stored thereon such a computer program and a data carrier signal carrying such a computer program.

BACKGROUND

In wireless local area networks, access points and wireless devices set up communication between themselves by exchanging management frames. Such management frames can be successfully communicated even when there is significant interference on, or heavy contention for, the wireless channels they are communicated over because, being relatively short (typically tens of bytes) in comparison to typical data frames (typically thousands of bytes), they only require the channel to be clear for a relatively short time. As described in Patent Cooperation Treaty application publication WO 2015/145169 A1, this can lead to users of wireless devices being presented with an indication of the availability of a network connection but finding when they try to use that connection (for example to load a web portal login page) that it is of a disappointing or perhaps even unusable quality.

WO 2015/145169 A1 proposes reducing occurrences of this scenario by introducing a test procedure. Specifically, the attachment of a wireless device to a wireless network triggers the access point providing that wireless network to send the wireless device one or more test frames. Only if receipt of those test frames is acknowledged by the wireless device, does the access point provide the wireless device with the information it needs in order to establish a connection to the Internet through the access point.

As the population become habituated to conducting an increasing number of tasks on mobile devices, making use of wireless network connections, uplink traffic is increasing. For example, streaming video content such as television programs and feature films to mobile devices such as smartphones and tablets has now been commonplace for a number of years. Data intensive upload of user-generated content however, for example upload of video clips recorded on such devices to social media platforms, has only recently experienced a surge in popularity. In this context, users can become frustrated when attempting to use wireless connections with poor uplink channel qualities. This problem is exacerbated by the way in which available wireless network connections are generally presented by mobile devices to users for selection; arranged in descending order of the strength of a signal received by the mobile device from the access point over the downlink channel, with no indication of uplink channel quality.

What is needed is a way of ensuring that wireless connections are only made available if both their downlink and uplink channels are of sufficient quality to support typical data traffic.

SUMMARY

According to a first aspect, there is provided a computer-implemented method of operating a wireless network access point of a wireless network. The method comprises wirelessly exchanging management frames with a device to attach the device to the access point. A wireless downlink data communication channel from the access point to the device and a wireless uplink data communication channel from the device to the access point are thereby established. The method further comprises, in response to attaching the device to the access point, performing a wireless link test. The wireless link test comprises transmitting a test frame to the device on the downlink channel. The test frame is of a length greater than each of the management frames, comprises a sequence of test data bits and is configured to require a mirror response comprising said sequence of test data bits. The test further comprises monitoring for receipt of said mirror response on the uplink channel and determining whether the test is passed or failed. The test is only passed if the mirror response is received on the uplink channel.

Exchanging management frames with the device to attach the device to the access point can comprise forming a data link layer (layer two of the OSI model) connection between the access point and the device.

Performing the test can further comprise receiving the mirror response on the uplink channel and determining that the mirror response corresponds to the test frame by confirming that the mirror response comprises the sequence of test data bits with no more than a predetermined threshold bit error rate (BER) (for example between 0 and 20% BER, e.g. 10% BER); the test thereby being determined to be passed.

The method can further comprise, in response to determining that the test is passed, providing the device with network access.

Providing the device with network access can comprise providing the device with a network address. The network address can be an Internet address, for example an Internet Protocol (IP) address.

The method can further comprise, in response to providing the device with the network address, transmitting a network availability message to the device. The network availability message can be configured to cause the device to provide an indication of network availability through a user interface comprised in the device.

Providing the device with network access can comprise forming a network layer (layer three of the OSI model) connection between the access point and the device. The step of forming the layer three connection can comprise completing a four-way handshake according to the Dynamic Host Configuration Protocol (DHCP).

Performing the test can further comprise determining that a timer or counter has expired without the mirror response being received on the uplink channel; the test thereby being determined to be failed. The method can further comprise, in response to determining that the test is failed, performing one or more of:

ignoring a network access configuration initiation message received from the device, such as a DHCP Discover or Request message;

transmitting a message to the device to indicate that the access point will not provide the device with network access;

initiating handover of the device to a neighboring wireless access point;

transmitting a message to the device to indicate that it should attempt to obtain network access through the access point on a different frequency band;

transmitting a message to the device to indicate that network access can be provided but that quality of service is expected to be poor; and terminating the attachment of the device to the access point.

The test frame can be configured to require the mirror response by the method further comprising constructing the test frame as a unicast Action frame which is deliberately in syntactic error and setting a most significant bit (MSB) of a Category field of the test frame to 0. Constructing the test frame as a unicast Action frame which is deliberately in syntactic error can comprise assigning the test frame a Category field which is undefined in a wireless communication protocol according to which the wireless network operates. Determining that the mirror response corresponds to the test frame can comprise confirming that a Category field of the mirror response has an MSB set to 1.

The method can further comprise constructing the test frame to be greater than 14 bytes in length, e.g. greater than 100, 500 or 1000 bytes in length. The method can further comprise constructing the test frame to have a length of substantially a maximum frame length permitted by a protocol the access point and the device are configured to communicate under, for example a length of at least 90% of the maximum frame length, e.g. 2346 bytes.

The method can further comprise, prior to performing the wireless link test, determining a type of traffic likely to be communicated on one or both of the uplink and downlink channels and constructing the test frame to have a length characteristic of that type of traffic. Determining the type of traffic likely to be communicated can comprise referring to a data structure which links data in the management frames indicative of the device's identity or type with one or more types of traffic historically communicated using that device or that type of device respectively.

The test can comprise transmitting a plurality of test frames to the device on the downlink channel. The plurality of test frames can optionally have different characteristics to one another, such as their respective sequences of test data bits being of different lengths and/or the plurality of test frames being sent at different bit-rates and/or using different modulation schemes.

The method can further comprise determining that a signal received on one of the uplink channel and the downlink channel has a strength below a predetermined threshold value, such as −82 dBm, the test being performed in response thereto.

According to a second aspect, there is provided an access point configured to perform the method of the first aspect.

According to a third aspect, there is provided a system comprising the access point of the second aspect and the wireless device. The access point and the device can be configured to communicate with one another according to an Institute of Electrical and Electronics Engineers (IEEE) 802.11 wireless communication protocol.

According to a fourth aspect, there is provided a computer program comprising instructions which, when the program is executed by a computer, cause the computer to carry out the method of the first aspect.

According to a fifth aspect, there is provided a computer-readable data carrier having stored thereon the computer program of the fourth aspect.

According to a sixth aspect, there is provided a data carrier signal carrying the computer program of the fourth aspect.

BRIEF DESCRIPTION OF THE FIGURES

Aspects of the present disclosure will now be described by way of example with reference to the accompanying figures. In the figures:

FIG. 3 is an example temporary link test result table, according to embodiments.

FIG. 4 is an example Internet access approval list, according to embodiments.

DETAILED DESCRIPTION

The following description is presented to enable any person skilled in the art to make and use the system and is provided in the context of a particular application. Various modifications to the disclosed embodiments will be readily apparent to those skilled in the art.

It is proposed to introduce an automatic test procedure into the process of connecting a wireless device to a network via a wireless network access point. In response to successful exchange of management frames to attach the device to the access point, establishing both a downlink data communication channel from the wireless network access point to the wireless device and an uplink data communication channel in the opposite direction, at least one test frame is transmitted on the downlink. The test frame is of sufficient length to be representative of both typical downlink and uplink data frames. It is also configured to require a mirror response from the wireless device. The access point can be configured to only proceed to provide the device with the opportunity to connect to the network if the mirror response is received, implying that both the downlink and the uplink can handle frames of sizes similar to the test frame.

Figure 1:
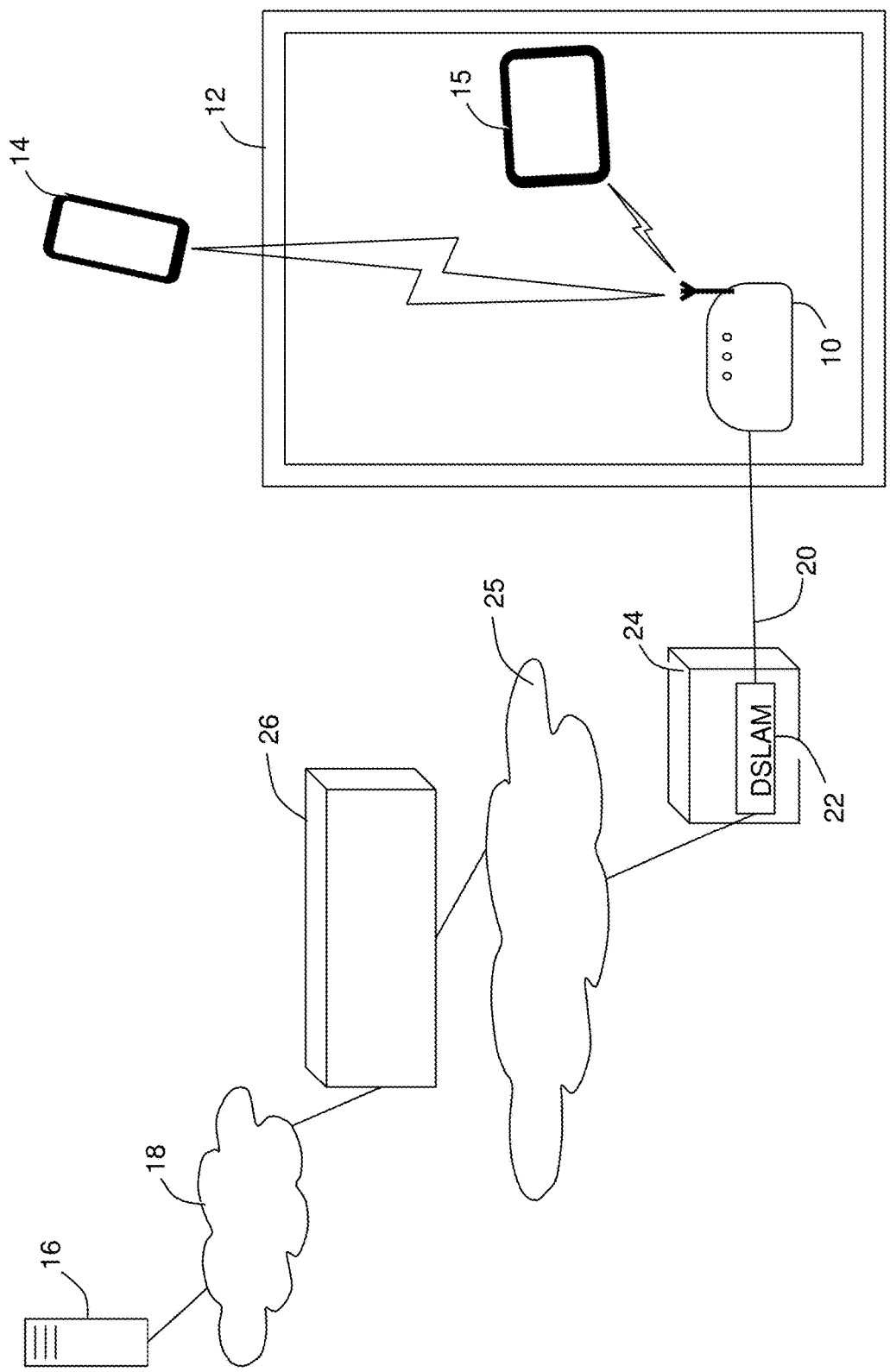
FIG. 1 is a schematic illustration of an example wireless local area network, according to embodiments.

FIG. 1 schematically illustrates an example wireless local area network provided by an access point 10 located in a building 12. Should the access point 10 provide each of the wireless devices 14, 15 with Internet configuration information (in particular an Internet Protocol, 'IP', address), the wireless device 14, 15 is then able to download data from server computers 16 connected to the Internet 18. In order to provide the access point 10 with connectivity to the Internet 16, a pair of copper wires 20 extends from the access point 10 to a digital subscriber line access multiplexer (DSLAM) 22 installed in a nearby street cabinet 24. The DSLAM 22 is in turn connected by a wide-area switched network 25 to a broadband remote access server (BRAS) 26 which is connected to the Internet 18.

Figure 2:
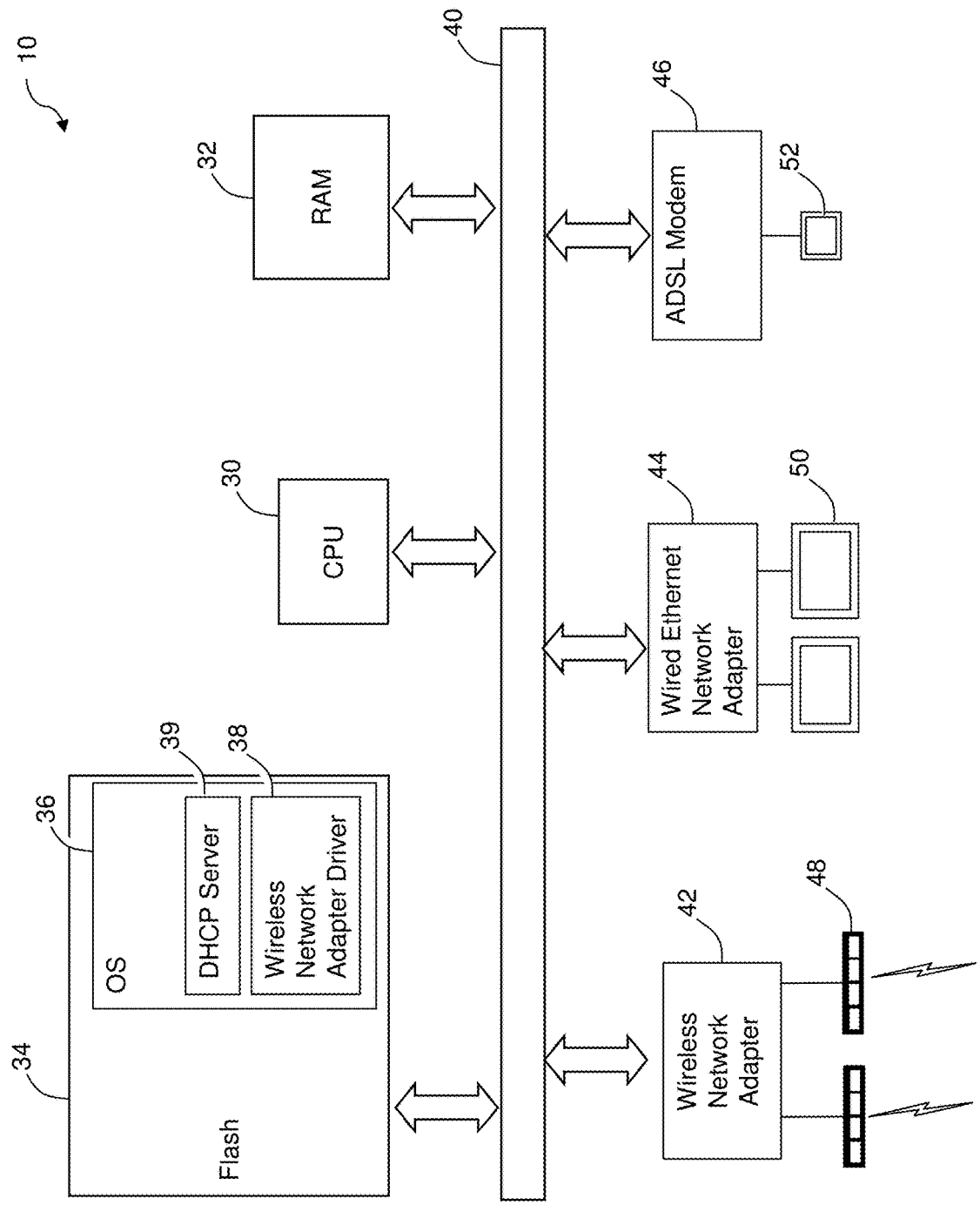
FIG. 2 is a schematic illustration of an example access point, according to embodiments.

FIG. 2 is a schematic illustration of an example access point 10. It comprises a central processing unit 30, a volatile memory 32, a flash memory 34 containing an operating system program 36 (in this case a stripped-down Linux kernel) which has a modified wireless network adapter driver program 38, and a modified DHCP server program 39. (DHCP is an abbreviation for the Dynamic Host Configuration Protocol used for distributing network configuration parameters to a host.) The processor 30 is able to communicate with each of these memories via a communications bus 40. In use, the volatile memory 32 is used to store a temporary link test result table (FIG. 3) and an Internet access approval list (FIG. 4). The Internet access approval list is populated by the modified wireless network adapter driver 38 and used by the modified DHCP Server 39 as will be explained in more detail below.

Also communicatively coupled to the central processing unit 30 via the communications bus 40 are an 802.11 wireless network adapter 42, a wired Ethernet network adapter 44, and an asymmetric digital subscriber line (ADSL) modem 46.

The 802.11 wireless network adapter 42 is electronic hardware which drives one or more radio antennas 48 in order to send radio signals to nearby wireless devices (for example wireless devices 14, 15). When executed by the CPU 30, the wireless network adapter driver program 38 causes the CPU 30 to control the operation of the wireless network adapter 42 by sending commands over the system bus 40.

The wired Ethernet network adapter 44 is electrically connected to two RJ45 jacks 50 which can receive Ethernet cables in order to provide wired connections to computer devices (not shown) in the building 12. The ADSL modem 46 is electrically connected to an RJ11 jack 52 which receives a plug terminating the copper pair 20 leading to the nearby street cabinet 24. FIG. 3 shows an example data structure used to temporarily store the results of a test which may be carried out with a wireless device 14, 15 after that device has performed a layer 2 attachment to the wireless local area network offered by the access point 10. The data structure records an entry 58, 59 for each wireless device which is taking part in (or has recently taken part in) the link test procedure to be described below.

Each device entry includes a wireless device identifier (left-hand column 70), and, for each of a number (in this case five) of test frames, a test record 60-69 incorporating the length of a test frame transmitted by the access point 10 (central column 72), and a Boolean value indicating whether the frame sent in the test has been correctly mirrored by the wireless device (right-hand column 74). The identifier, in this example, is the wireless device's unique MAC (media access control) address.

In this example, test frames of different sizes are sent in order to gain an estimate of the channel conditions between the access point 10 and the wireless device 15. The larger test frames require more of the wireless local area network capacity and require a more reliable radio downlink channel in order to be received by the wireless device 15. Similarly, they require more of the wireless local area network capacity and require a more reliable radio uplink channel in order to be mirrored by the wireless device 15 back to the access point 10. The smallest test frames sent are of a similar size to the short frames used in the management messages used by the wireless devices 14, 15 when they join the wireless local area network offered by the access point 10.

FIG. 4 shows an IP access approval list which temporarily stores the identifiers of wireless devices which have a link to the access point which is sufficiently reliable to support typical Internet traffic on both the downlink data channel and the uplink data channel. Since entry 59 of the data structure of FIG. 3 records results indicating the test being passed in full, while entry 58 records the test being failed for the two largest test frames, the ID corresponding to entry 59 is included in the approval list of FIG. 4 (as entry 76) but not the ID corresponding to entry 58.

Figure 5:
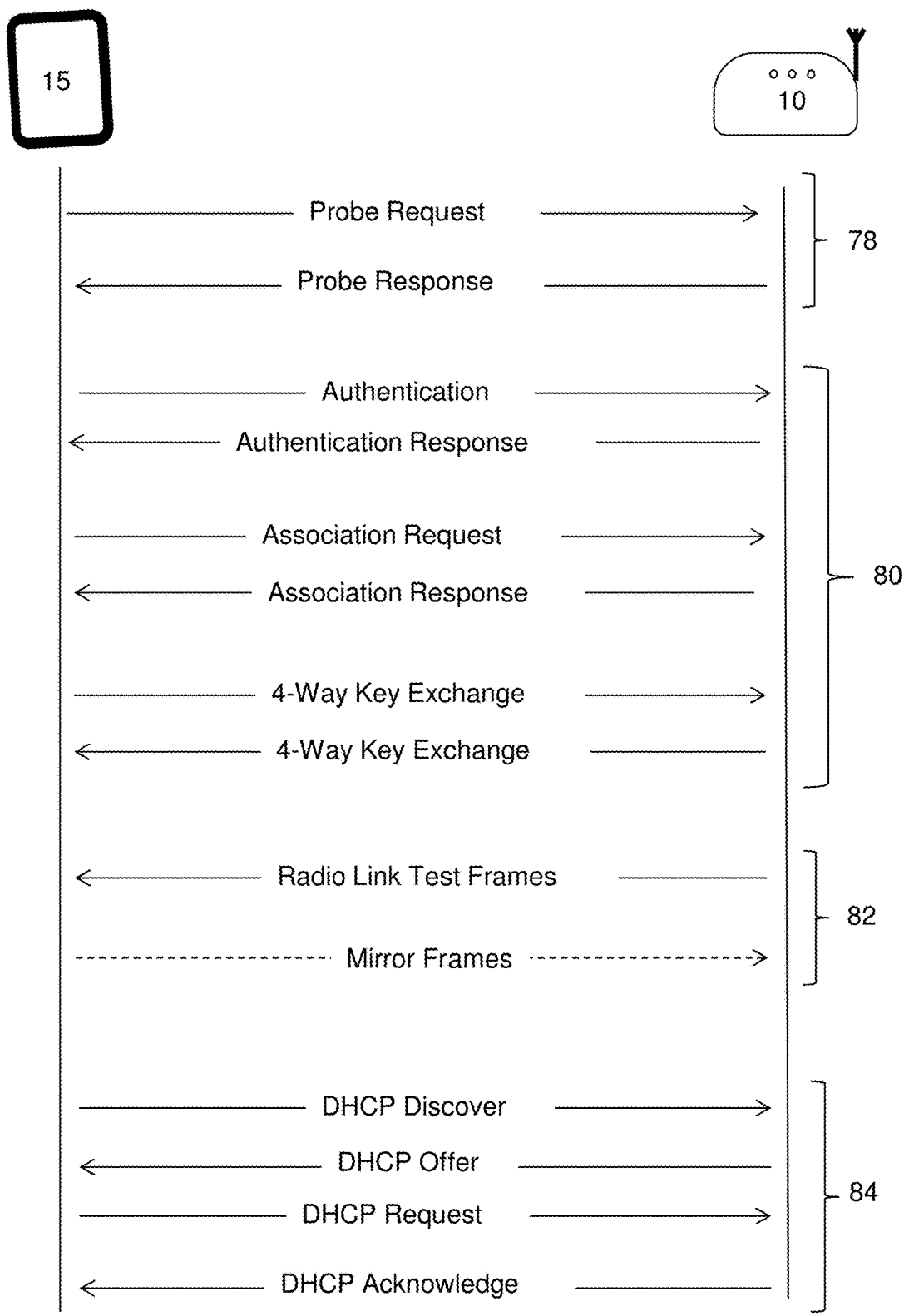
FIG. 5 is an example process for linking a wireless device to an access point, according to embodiments.

FIG. 5 illustrates an example of where the proposed test procedure could be introduced in a process for linking a wireless device 15 to an access point 10. The wireless device 15 is a conventional 802.11 capable device, and thus occasionally transmits a probe request radio message in accordance with the 802.11 standard in order to discover wireless local area networks to which it might connect. In accordance with the 802.11 standard, the access point 10, on receiving a probe request message, responds with a probe response message to alert the wireless device 15 to the presence of the wireless local area network. This exchange 78 is shown in FIG. 5.

If the wireless device 15 is configured to connect automatically to wireless local area networks, or if the user of the device 15 uses the device's user interface to ask to connect to the wireless local area network offered by the access point 10, an exchange 80 of management messages follows which can result in the wireless device 15 joining the wireless local area network. In practice, these management messages 80 are sent at the lowest data rate (or, at least, one of the lower rates) used in the wireless local area network in order to maximize the chance of the messages being received. (The effect of using the lowest data rate is that the access point 10 offers a wireless local access network which extends over the largest possible area.) The exchange of management messages 80 can for example comprise authentication and association requests and responses and four-way key exchange as shown. The completion of the exchange of management messages 80 can establish a layer two connection between the wireless device 15 and the access point 10.

In contrast to conventional wireless local access network operation, the access point 10 follows the exchange of wireless local area network management frames 80 with one or more test frames 82. In the current example, these test frames are sent by the access point 10 at whichever bit-rate the access point would conventionally use to send ordinary traffic frames to the wireless device 15 under these circumstances. The exchange of test frames will be described in more detail below with reference to FIGS. 6, 7 and 8.

Since the wireless device 15 is conventional, the wireless device 15 initiates an Internet access configuration message exchange 84 once its link to the wireless local area network is established, to establish a layer three connection.

The Internet access configuration message exchange 84 is initiated by the wireless device 15 sending either a DHCP Discover message or a DHCP Request message. The wireless device 15 sends a DHCP Request message initially if it works on the assumption that it is re-connecting the wireless local area network it was previously connected to, and therefore requests that it be given the same IP address as it was using previously. If that assumption is proved incorrect, or is not made, then the wireless device 15 sends a DHCP Discover message.

The access point 10 handles the DHCP Discover or DHCP Request message in a way that will be described in more detail below with reference to FIG. 9.

Figure 6:
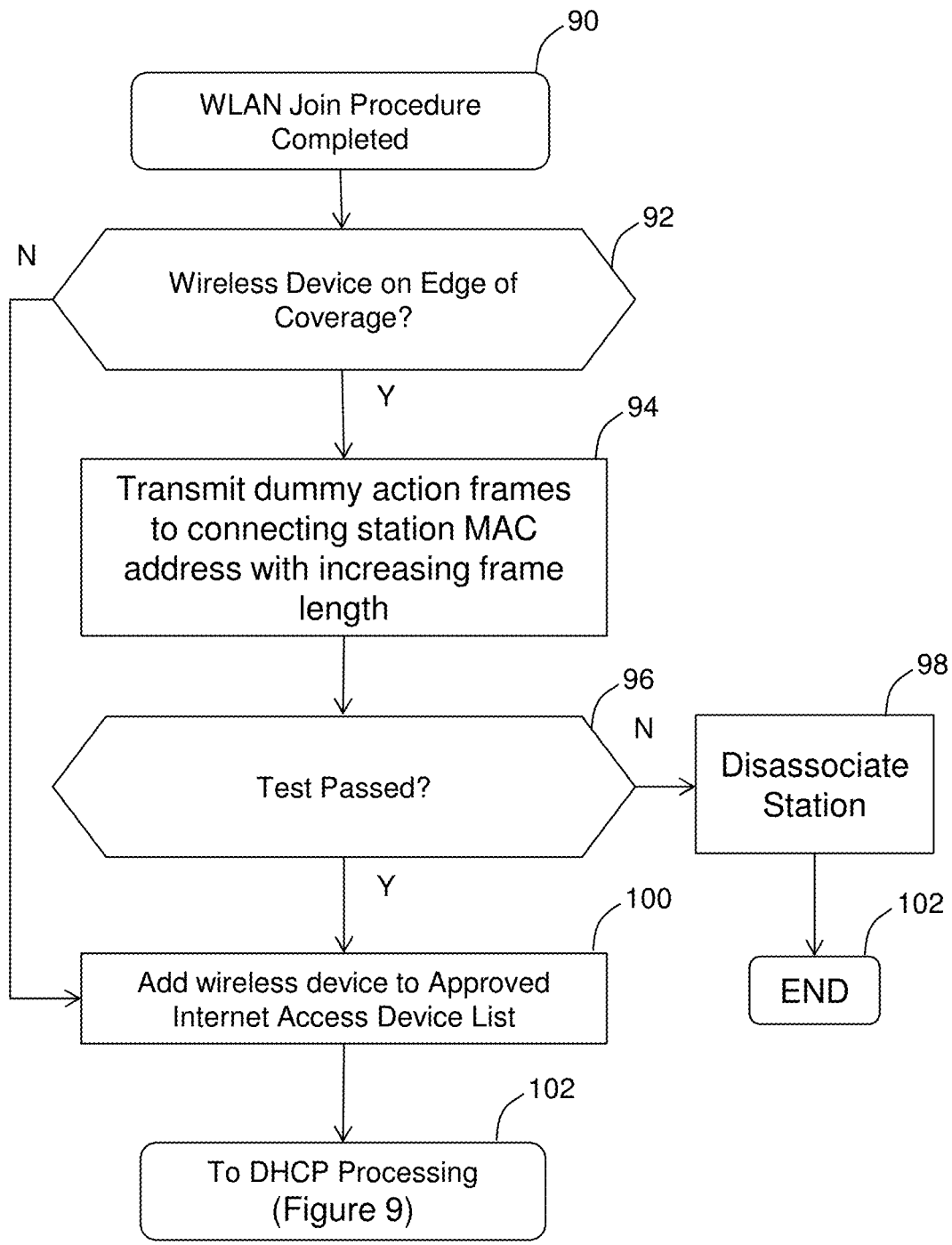
FIG. 6 is a flowchart of example modified operation of an access point under control of a modified wireless network adapter driver program, according to embodiments.

Example modified operation of the access point 10 under control of the modified wireless network adapter driver program 38 is illustrated by the flowchart of FIG. 6. It begins with the completion 90 of the conventional link establishment phase.

The access point 10 then carries out a signal strength test 92 to find whether the wireless device which has just established a link to the access point 10 is at or close to the edge of the range of the access point 10. In this particular example, the signal strength test 92 finds whether the strength of the signal from the wireless device is less than a threshold of −82 dBm (i.e. the radio signal from the wireless device 15 has a power less than few picowatts).

If the received signal strength is greater than the threshold, then the wireless device's MAC address is added 100 to the approved Internet access device list (shown in FIG. 4). This means that the testing to be described below in relation to steps 94 to 98 is omitted if the signal strength indicates a robust enough link that the testing appears to be unnecessary. If, on the other hand, the received signal strength is less than the −82 dBm threshold, then the access point 10 sends 94 a series of Action frames, each of which has a payload filled with dummy data, to the wireless device 15 and records whether those frames are correctly mirrored.

Figure 7:
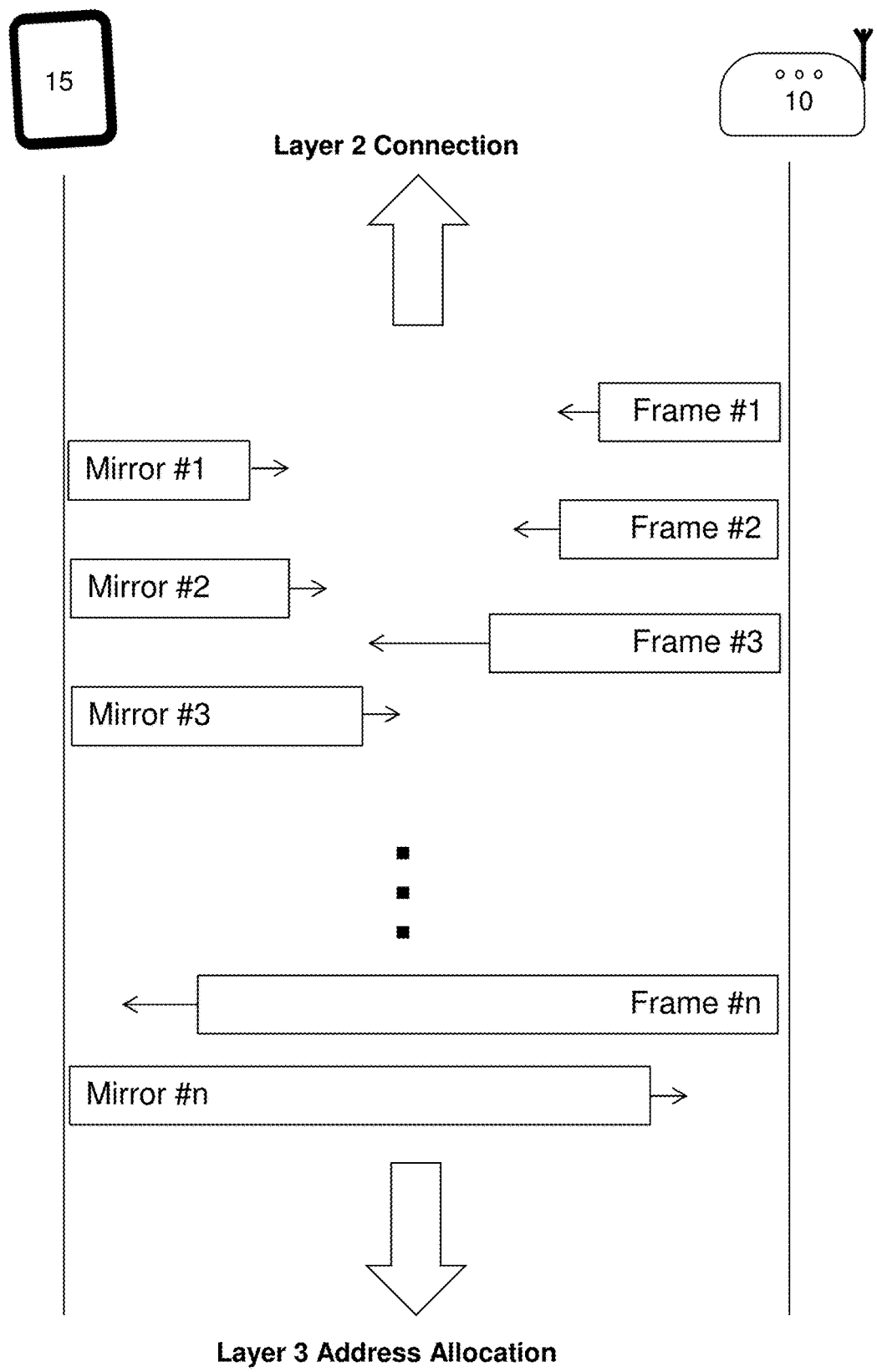
FIG. 7 is an example test message exchange, according to embodiments.
Figure 8:
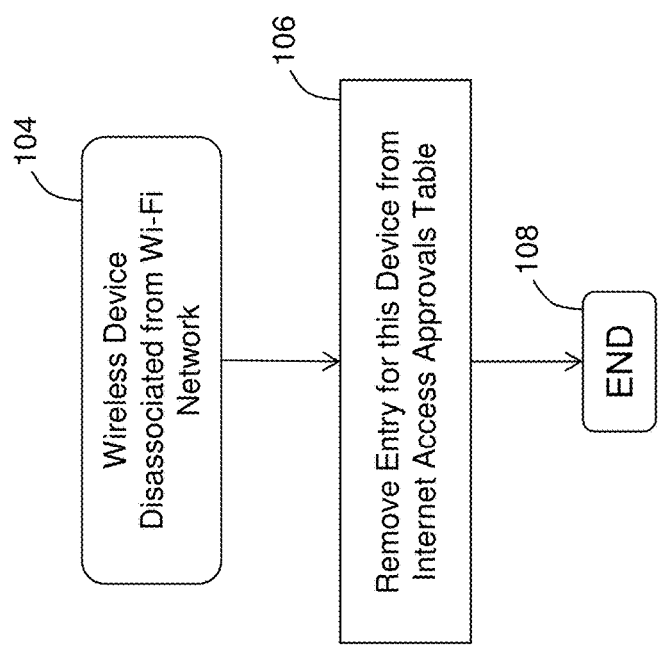
FIG. 8 is a flowchart of an example Internet access approval deletion routine, according to embodiments.

FIG. 7 illustrates the test message exchange. Each of n test frames is specifically crafted to be of the required length and to require a mirror response.

In this particular example, the wireless network adapter driver program 38 causes the access point 10 to transmit, in sequence, eight 802.11 unicast Action frames. The lengths of successive test frames in this particular example double, starting with a typical acknowledgement frame length, as follows:

First frame—14 bytes
Second frame—28 bytes
Third frame—56 bytes
Fourth frame—112 bytes
Fifth frame—224 bytes
Sixth frame—448 bytes
Seventh frame—896 bytes
Eighth frame—1792 bytes Other sequences could be used, with frame sizes up to whatever maximum is mandated for the protocol the access point is operating under, for example 2346 bytes for the latest IEEE 802.11 protocol at the time of writing. The test could optionally be abandoned if a mirror response is not received for any test frame, or if a received mirror response has more than a threshold bit error rate (BER) allowance. Instead of test frame size increasing gradually as in the example sequence above, it would be more efficient in some circumstances to start the test with the longest test frame, optionally continuing with further test frames, e.g. of decreasing size.

Some kinds of test sequences are suited to enabling gathering of additional connection characterization data. For example, sequences comprising relatively long test frames enable characterization in terms of BER better than sequences comprising only relatively short test frames. As another example, signal level variation (e.g. as calculated over frame preambles) can be characterized better within the same time interval if a greater number of test frames (and thus relatively short test frames) are sent in that interval.

Sequences can be tailored to the details of specific implementations, for example according to one or more of device type, network type, anticipated upload and/or download content type and service type. The device type or anticipated usage could be derived through maintenance of a database (locally or remote) of MAC address OUIs (organizational unique identifiers) or DHCP option fields that would permit fingerprinting of device types or operating systems in use.

If test sequences are to be tailored according to anticipated traffic, then this could for example be done on the basis of anticipated traffic type. For example, the sequence set out above may be appropriate if the anticipated traffic is web browsing, which generally has a large distribution of packet sizes due to the many different sources and types of data which can be involved. A test sequence consisting only of frames within a smaller size range (optionally with smaller test frame size increments to increase the granularity of the data gathered) may for example be more efficient if audio or video traffic is anticipated. E.g. if audio traffic is anticipated, which generally consists of many regular small packets, then the sequence could consist of test frames of no greater than 200 bytes. Similarly, if video traffic is anticipated the sequence could for example consist of test frames between 200 and 1500 bytes. Test sequences could also be tailored according to the protocol and/or encoding technique anticipated to be used, since these can also affect packet sizes. Where traffic can be anticipated to be of a type characterized by large frame sizes it may be particularly advantageous to reverse the test sequence as described above, with the largest test frames being transmitted first and the test being abandoned if any mirror response is missed.

The modified driver program 38 controls the access point 10 to record, for each of those frames, whether a mirror response is received from the wireless device. This information is recorded in the temporary test results table (shown in FIG. 3) stored in the access point's volatile memory 32.

Returning to FIG. 6, the modified driver program 38 then tests 96 whether the reliability of the radio link meets a pre-configured threshold. In the present case, the radio link reliability test 96 finds whether all of the test frames were mirrored. If the radio link reliability test 96 is not passed, then the access point 10 tears down the link between the access point 10 and the wireless device 15 by disassociating 98 the wireless device 15 in accordance with the 802.11 standard. The radio-link reliability testing procedure then ends 102.

If, on the other hand, the radio link reliability test 96 is passed, then the MAC address of the wireless device is added 100 to the approved Internet access device list. The radio-link reliability testing procedure then ends 102.

By way of an example use case, should the test results be as shown in FIG. 3, and the test conditions require that all five frames are mirrored, then the wireless device 14 outside the building 12 (that device's MAC address being 8C:2D: AA:0D:C5:14) would fail the test. The access point 10 would then disassociate that wireless device. By contrast, the wireless device 15 within the building (the MAC address of that device being 8C:2D:AA:0D:C5:15) would pass the test and would be entered into the Internet access approval list as is shown in FIG. 4.

In order to keep the Internet access approval list (FIG. 4) reasonably current, each time a wireless device 14, 15 disassociates or detaches from the access point 10, an Internet access approval deletion routine (FIG. 8) is run in which the access point 10 reacts to the disassociation 104 by deleting 106 any entry relating to the disassociated wireless device from the Internet access approval list (FIG. 4).

Figure 9:
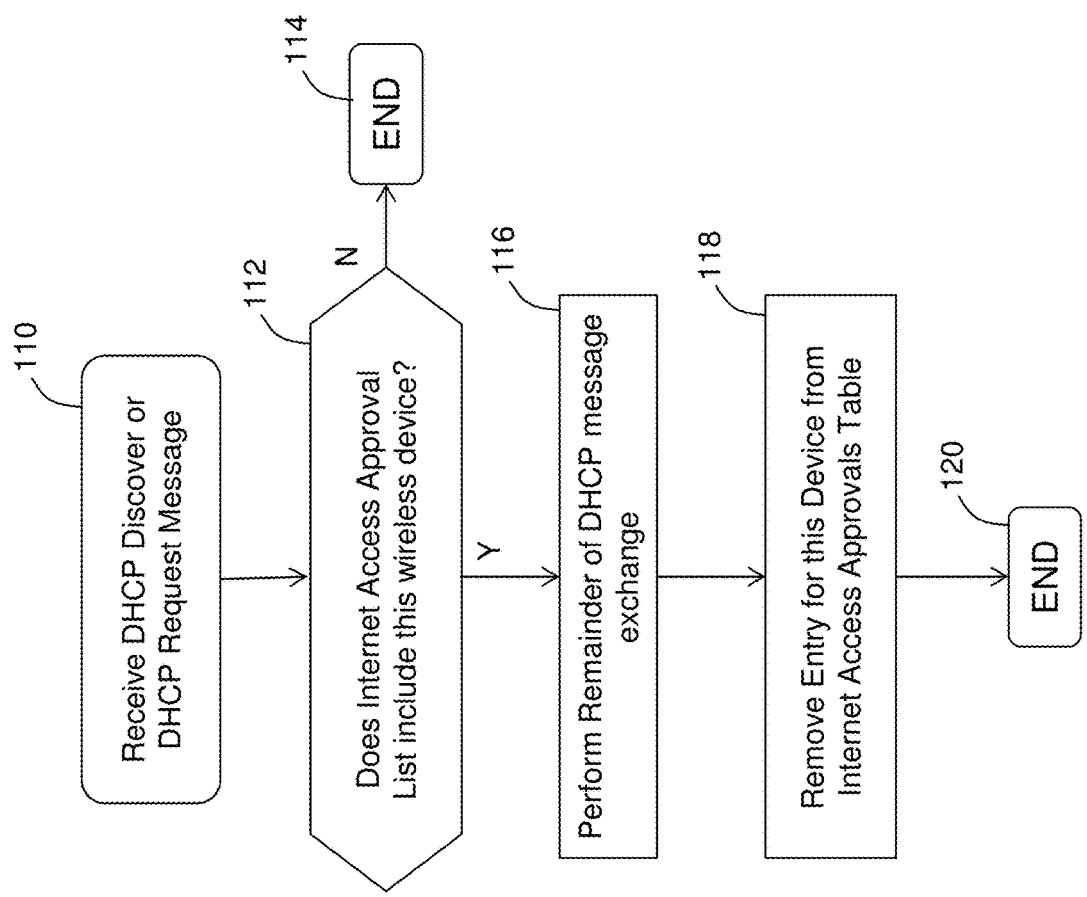
FIG. 9 is a flowchart of an example inbound DHCP (Dynamic Host Configuration Protocol) message-handling procedure performed by an access point under the control of a modified DHCP server program, according to embodiments.

The inbound DHCP message-handling procedure performed by the access point 10 under the control of the modified DHCP server program 39 is shown in FIG. 9. On receiving 110 a DHCP Discover or DHCP Request message, the access point 10 checks 112 whether the MAC address of the sender of the 802.11 frame is to be found in the approved Internet access devices table (FIG. 4) stored in the access point's volatile memory 32. If the MAC address of the sender is not present in that table, then the DHCP message-handling procedure ends 114. (In other words, if the sender of the frame has not demonstrated a sufficiently reliable radio link to the access point 10 during the radio-link reliability test procedure (FIG. 6), then DHCP messages from the wireless device are ignored.)

However, if that table does include the MAC address of the wireless device which sent the DHCP message, then the remainder of the DHCP message exchange is handled 116 in a conventional manner, providing the wireless device 15 with the information it needs in order to access the Internet via the access point 10. The modified DHCP message handling procedure then ends 120.

It will be seen how the above example prevents a wireless device which has an unreliable radio link to an access point from being able to use that access point to access the Internet. Since any procedure run by the wireless device for manually or automatically joining the Internet is unsuccessful, the user of the wireless device is spared the disappointment of seeing an Internet connectivity indication on their device, only to find that they are, in fact, unable to usefully interact with servers on the Internet. Furthermore, by basing the radio link assessment on a range of frame sizes, an estimate of the radio channel conditions can be obtained.

Many variations may be made to the above-described example. These include, but are by no means limited to, the following.

i) Whilst a series of test frames were sent in the above example in which each test frame was larger than the previous test frame, the radio-link reliability test might send only a single frame of a length substantially greater than a management frame. The order in which the frames are sent might be varied (i.e. there need not be a monotonic increase in the length of the test frames sent in the series). Indeed, the test frames could be a plurality of frames, each having the same length and each being of a length substantially greater than a management frame. In other examples, the longer frames might be sent first, and the test failed if any frame is not mirrored.

ii) Whilst in the above example the sending of a series of test frames was bypassed if the signal strength was found to exceed a −82 dBm threshold, the signal strength test might be omitted so that all wireless devices must engage in mirroring one or more test frames before being enabled to join the Internet. The actual value of the signal strength threshold could vary from the above value.

iii) In the above example, only if every one of the series of test frames were mirrored, was the wireless device allowed to join the Internet. In other examples, mirroring of a subset of the test frames might be sufficient to pass the radio reliability link test. In some cases, the signal strength test and radio link reliability test might be made dependent on one another—so, for example, failing the signal strength test might not be determinative of whether Internet access is denied, but instead the number of test frames required to be mirrored to pass the radio link reliability test might be greater for wireless devices that fail the signal strength test than for devices that pass it. Similarly, wireless devices that fail the signal strength test might be sent a greater number of test frames or test frames of a greater length or both.

iv) In the above example, the access point determined the bit-rate at which the test frames were to be sent in the same way it determines the bit-rate for sending normal Internet downlink traffic. However, the bit-rate could be varied in order to vary the difficulty of the radio-link reliability test—in the same way that longer test frames require a more reliable radio link, test frames sent at a higher bit-rate require a more reliable radio link.

v) Whilst the above example relates to the popular 802.11 wireless networking standard, in other examples, wireless Internet access via different radio technologies might be controlled in a similar way. Examples of other wireless Internet access technologies include Bluetooth®.

vi) In practice, if, as in the above example, the access point starts with small packets (like those used to establish the layer two Wi-Fi connection) these might be mirrored, but larger frames similar to those used for landing page traffic might not. In an alternative example, the access point might store a threshold value that could be configured to set the difficulty of the radio link reliability test. The threshold value might for example be configured to match the above example such that all test frames must be mirrored. Alternatively, the configurable parameter could be set to a less demanding value—for example it might be set to a value such that mirroring of test frames up to 750 bytes is required from a wireless device before the access point provides Internet access to that device.

vii) In the above example, the access point does not retransmit frames for which no immediate mirror response is received. In alternative examples, the access point might try to retransmit an unmirrored frame one or more times, and the test record might include a record of the number of retransmissions required before the frame is mirrored. In that case, whether the radio link passes the test might depend upon the lengths of the frames sent, whether the frames are mirrored within a threshold number of attempts, and for those frames which are mirrored, the number of transmissions and retransmissions required before receipt of the test frame is mirrored.

viii) In the above example, the test conditions did not include the bit-rate at which the access point sends the test frame. In alternative examples, the bit-rate at which the frames (and possibly retransmissions of the frames) are sent is included in each test record. In that case, whether the radio link passes the test might depend upon the lengths of the frames sent, and the bit-rate at which the frames and any retransmissions of the frames were sent.

ix) In the above example, one test frame of each size was sent. In alternative examples, a plurality of test frames of each size could be sent, and whether the radio link test is passed could depend upon the number, fraction or percentage of the frames of each size which are mirrored.

x) In the above example, the results of the radio link testing process were communicated to the Internet access control process using an Internet access approval list stored in the access point's temporary memory. In other examples, other forms of inter-process communication might be used instead. In some examples, a list of devices that have passed the radio link test might be stored in a memory separate from, but nevertheless accessible by, the access point.

xi) In the above example, the access point forced the disassociation of a wireless device which failed the radio link test. In other examples, the access point could, for a predetermined period of time, block subsequent reattempts from the same wireless device to associate with the access point.

xii) In the above example, the access point provides (or denies) access to the Internet. In other examples, the access point could similarly provide (or deny) access to any other network.

In summary of the above disclosure, a method of controlling wireless network access is disclosed in which the access point providing that wireless network sends the wireless device one or more test frames requiring a mirror response. If those test frames are mirrored by the wireless device the access point can then provide the wireless device with the information it needs in order to establish a connection to the network through the access point.

Figure 10:
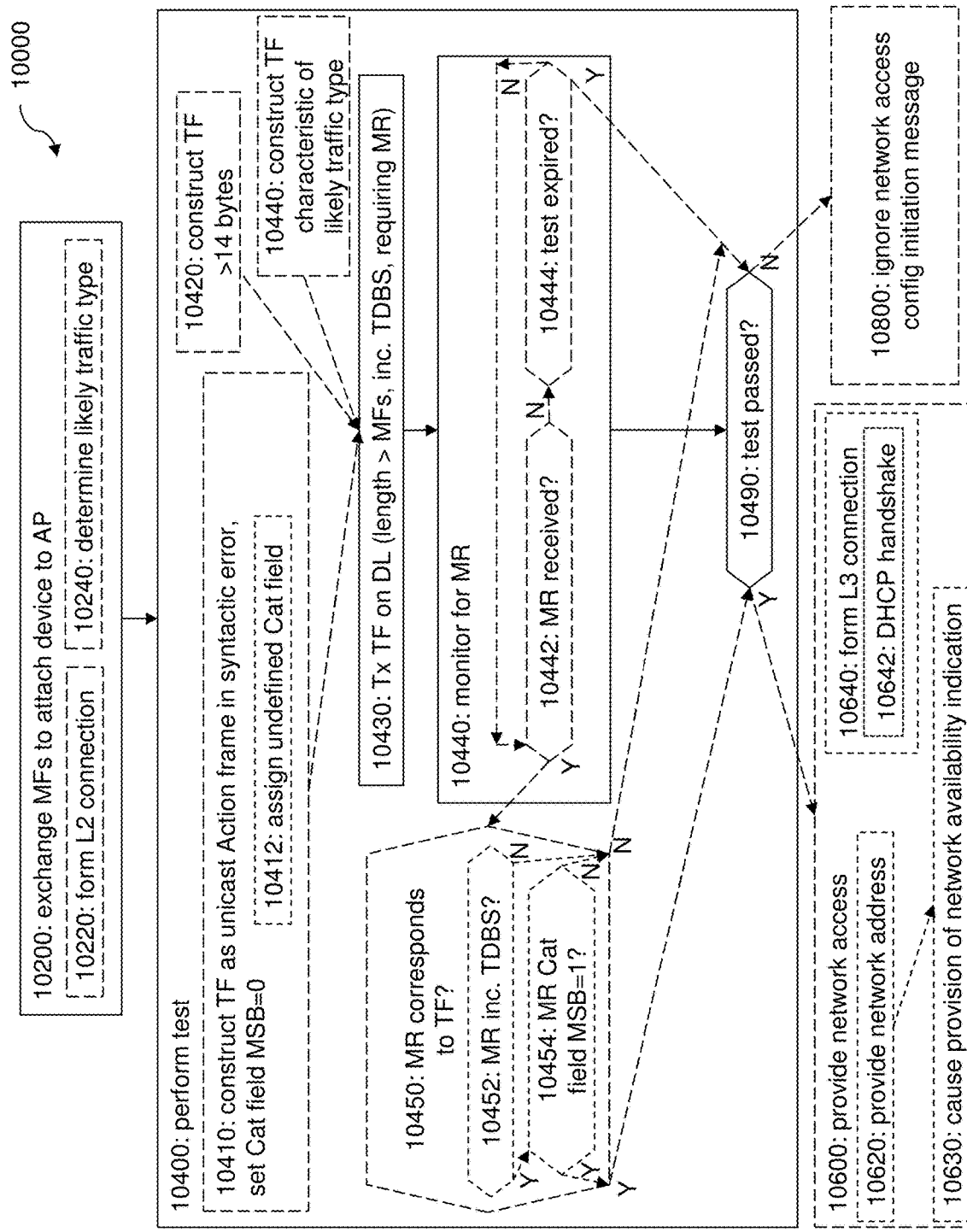
FIG. 10 is a flowchart illustrating an example computer-implemented method of operating a wireless network access point of a wireless network, according to embodiments.

FIG. 10 is a flowchart illustrating an example computer-implemented method 10000 of operating a wireless network access point of a wireless network. At step 10200, management frames (MFs) are wirelessly exchanged with the device to attach the device to the access point (AP), thereby establishing both a wireless downlink (DL) data communication channel from the access point to the device and a wireless uplink (UL) data communication channel from the device to the access point. Next, a wireless link test is performed at step 10400. This comprises transmitting (Tx) a test frame (TF) to the device on the downlink channel at step 10430. The test frame is of a length substantially greater than each of the management frames. It comprises a test data bit sequence (TDBS). It is also configured to require a mirror response (MR) comprising said sequence of test data bits. The wireless link test continues by monitoring for receipt of said mirror response on the uplink channel at step 10440. At query 10490 it is determined whether the test is passed, wherein the test is only passed if the mirror response is received on the uplink channel.

Step 10200 can for example comprise forming a layer two (L2) connection between the access point and the device at optional step 10220.

In the event that a response to the test frame is received on the uplink channel, performing the test can further comprise determining whether the mirror response corresponds to the test frame by confirming that the mirror response comprises the sequence of test data bits. In this way, if a response is received, but it is an imperfect mirror of the test frame, then it can be inferred that errors in the test data bit sequence were introduced due to a poor-quality downlink or uplink channel. In that case, the test would be determined to be failed. This behavior is illustrated by optional queries 10442 and 10450. At query 10442 it is determined whether a mirror response is received. Then, if query 10442 is answered in the affirmative, it can be determined at query 10450 whether the mirror response corresponds to the test frame. This comprises determining whether a sequence of data bits in the mirror response matches the test data bit sequence at optional query 10452.

Optional query 10452 could require a bit for bit match of the test data bit sequence, or could allow for up to a threshold BER, for example between 0 and 20% BER, e.g. 10% BER. If optional query 10450 is being implemented then it must be answered in the affirmative for the test to be passed, i.e. for the output of query 10490 to be positive. If query 10450 is answered in the negative then the test is failed, so the output of query 10490 is negative.

If the test is determined to be passed at query 10490, the device can be provided with network access at optional step 10600. This can for example comprise providing the device with a network address, such as an IP address, at optional step 10620. This can be followed by optional step 10630 where the access point transmits a network availability message to the device, the network availability message being configured to cause the device to provide an indication of network availability through a user interface comprised in the device. For example, the device could be configured to display a web portal login page and/or a Wi-Fi availability icon in response to receipt of a network availability message. A layer three (L3) connection between the access point and the device can alternatively or additionally be formed at optional step 10640. Optional step 10640 can optionally comprise completing a four-way DHCP handshake at optional step 10642.

Performing the test can further comprise determining whether a timer or counter has expired without the mirror response being received on the uplink channel at optional query 10444, which flows from the negative output of query 10442. If query 10444 is answered in the affirmative then the test is determined to be failed, so the output of query 10490 is negative. If query 10444 is answered in the negative, then the flow loops back to query 10442.

If the test is determined to be failed at query 10490 then a network access configuration initiation message received from the device, such as a DHCP Discover or Request message, can be ignored at optional step 10800. In that case the device would be free to attempt to join another network. Other actions could be implemented alternatively or additionally to optional step 10800. For example:

a) a message could be transmitted to the device to indicate that the access point will not provide the device with network access;
b) handover of the device to a neighboring wireless access point could be initiated;
c) a message could be transmitted to the device to indicate that it should attempt to obtain network access through the access point on a different frequency band;
d) a message could be transmitted to the device to indicate that network access can be provided but that quality of service is expected to be poor; or
e) an attachment of the device to the access point could be terminated, if such an attachment was made during step 10200.

These actions could be combined in a variety of ways. For example, any combination of actions a, b, and e could be implemented flowing from a negative output of query 10490, with or without step 10800.

Step 10400 can further comprise constructing the test frame as a unicast Action frame which is deliberately in syntactic error and with a most significant bit (MSB) of the Category (Cat) field set to 0 at optional step 10410. This can comprise assigning the test frame a Category field which is undefined in a wireless communication protocol according to which the wireless network operates at optional step 10412. If optional step 10412 is implemented then optional query 10454 can also be included, so that determining that the mirror response corresponds to the test frame at query 10450 comprises confirming that a Category field of the mirror response has an MSB set to 1 at query 10454. Query 10454 (and step 10412) are of particular relevance if the access point and device are operating as defined in IEEE 802.11-2007 Section 7.3.1.11, which mandates that:

If a STA receives a unicast Action frame with an unrecognized Category field or some other syntactic error and the MSB of the Category field set to 0, then the STA shall return the Action frame to the source without change except that the MSB of the Category field is set to 1.

(Note that, in the context of this particular standard, the test frames should not simply be deliberately erred by the access point as this would fail the cyclic redundancy error check at the receiver, causing the test frames to be discarded without response.)

As has been explained above, the test frame is of a length substantially greater than each of the management frames (which are generally of order tens of bytes), and of typical acknowledgement frames (which are e.g. 14 bytes). For example, the method can further comprise constructing the test frame to be greater than 14 bytes in length, e.g. greater than 100, 500 or 1000 bytes in length, or substantially the maximum length permitted by a protocol the access point is operating under, for example at least 90% of the maximum frame length (e.g. 2346 bytes in the IEEE 802.11 protocol at the time of writing) at optional step 10420.

Step 10200 could optionally comprise, prior to performing the wireless link test, determining a type of traffic likely to be communicated on one or both of the uplink and downlink channels at optional step 10240. If so, then step 10400 could comprise optional step 10440 of constructing the test frame to have a length characteristic of that type of traffic. Determining the type of traffic likely to be communicated at optional step 10240 could for example comprise referring to a data structure (e.g. a database) which links data in the management frames indicative of the device's identity or type with one or more types of traffic historically communicated using that device or that type of device respectively. Such a data structure could be accessible locally or remotely via a communication link.

The method 10000 only refers to a single test frame. However, the test could comprise transmitting a plurality of test frames to the device on the downlink channel, the plurality of test frames optionally having different characteristics to one another, such as their respective sequences of test data bits being of different lengths—e.g. as described above in relation to FIG. 7. In this way, an estimate of the link quality can be obtained. Frame sizes, rate of increase (if increasing frame sizes are used) and the length of the test (in terms of number of test frames, time allowed for each mirror frame to be received or total test time) can be configured to suit the particular implementation, or dynamically adapted e.g. depending on radio conditions, congestion levels or type of device attempting connection.

As described above in relation to FIG. 6, there could optionally be some circumstances in which the test of method 10000 is bypassed, for example if it is determined that a signal received on one of the uplink channel and the downlink channel has a strength above a predetermined threshold value, such as −82 dBm.

Figure 11:
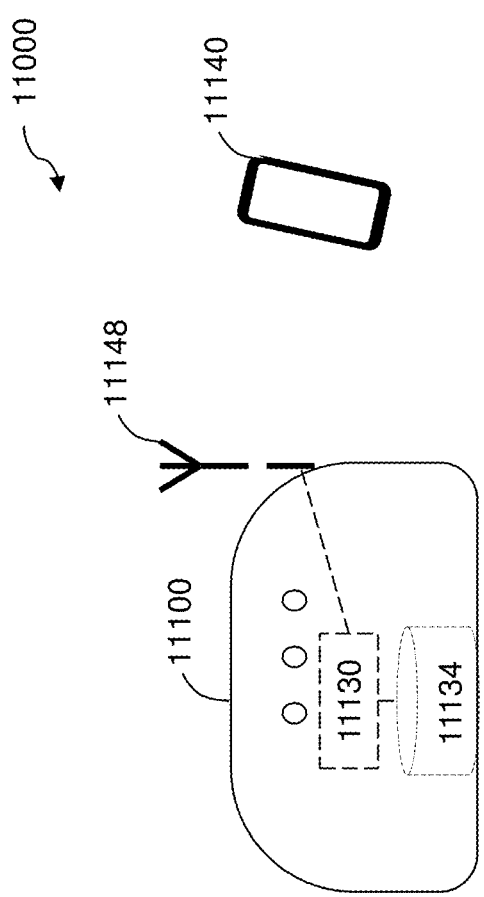
FIG. 11 is a schematic illustration of an example access point configured to perform the method of FIG. 10, according to embodiments.

FIG. 11 schematically illustrates an access point 11100 configured to perform the method 10000 of FIG. 10. The access point 11100 is comprised in a system 11000 which further comprises the wireless device 11140 referred to above in relation to the method 10000. The access point 11100 and the device 11140 can for example be configured to communicate with one another according to an IEEE 802.11 wireless communication protocol.

The access point 11100 may be configured to perform the method 10000 as a result of executing a computer program. Such a computer program may be stored on a computer-readable data carrier 11134, which could be an in-built memory of the access point 11100 or a removable data storage device. Alternatively, such a computer program could be delivered to the access point via a data carrier signal received by it through a wired or wireless communication interface. The computer program can for example be executed by a processor 11130 which controls a wireless communication interface 11148.

Figure 12:
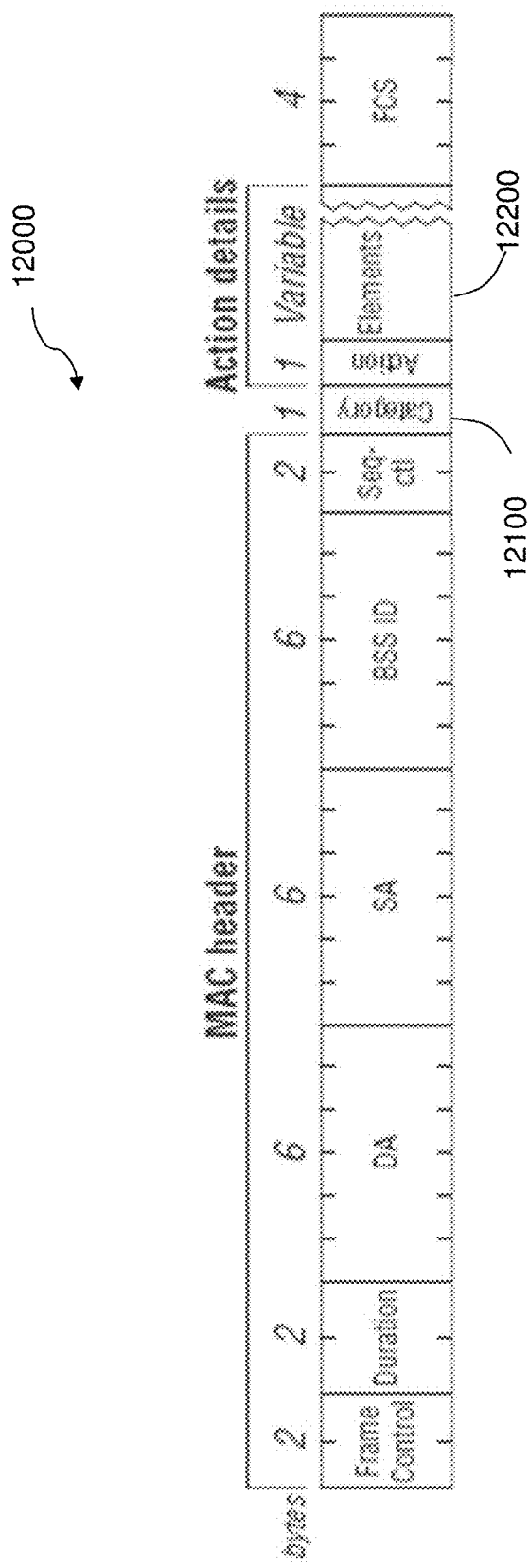
FIG. 12 is an example test frame constructed as a unicast Action frame, according to embodiments.

FIG. 12 illustrates an example test frame 12000 constructed as a unicast Action frame. The Category field 12100 can for example be undefined in the protocol the system is operating under, or some other syntactic error could be introduced. The MSB of the Category field 12100 can be set to 0. The variable length portion of the frame 12200 can be set to whatever length is required, as described above, within any limits set by the protocol.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers.

User input devices can include, without limitation, microphones, buttons, keypads, touchscreens, touchpads, trackballs, joysticks and mice. User output devices can include, without limitation, speakers, buzzers, display screens, projectors, indicator lights, haptic feedback devices and refreshable braille displays. User interface devices can comprise one or more user input devices, one or more user output devices, or both.

The invention claimed is:

1. A computer-implemented method of operating a wireless network access point of a wireless network, the method comprising:
   wirelessly exchanging management frames with a device to attach the device to the access point in order to establish:
   a wireless downlink data communication channel from the access point to the device, and
   a wireless uplink data communication channel from the device to the access point;
   responsive to establishing the wireless downlink communication channel and the wireless uplink data communication channel thereto, performing a test of the wireless downlink communication channel and the wireless uplink data communication channel at a data link layer, the test including:
   transmitting a test frame to the device on the wireless downlink data communication channel, the test frame:
   having a length greater than each of the management frames,
   including a sequence of test data bits, and
   being configured to require a mirror response comprising the sequence of test data bits;
   monitoring for receipt of the mirror response on the wireless uplink data communication channel; and
   determining whether the test is passed or failed, wherein the test is only passed if the mirror response is received on the wireless uplink data communication channel.

2. The method of claim 1, wherein performing the test further comprises:
   receiving the mirror response on the wireless uplink data communication channel; and
   determining that the test is passed when the mirror response corresponds to the test frame by confirming that the mirror response comprises the sequence of test data bits with no more than a predetermined threshold bit error rate (BER).

3. The method of claim 2, further comprising, in response to determining that the test is passed, providing the device with network access.

4. The method of claim 3, wherein providing the device with network access comprises providing the device with a network address.

5. The method of claim 4, further comprising, in response to providing the device with the network address, transmitting a network availability message to the device, wherein the network availability message is configured to cause the device to provide an indication of network availability through a user interface comprised in the device.

6. The method of claim 1, wherein performing the test further comprises:
   determining that the test is failed when a timer or counter has expired without the mirror response being received on the wireless uplink data communication channel.

7. The method of claim 6, further comprising, in response to determining that the test is failed, performing one or more of:
   ignoring a network access configuration initiation message received from the device, wherein the network access configuration initiation message is a Dynamic Host Configuration Protocol (DHCP) Discover or Request message;
   transmitting a message to the device to indicate that the access point will not provide the device with network access;
   initiating handover of the device to a neighboring wireless access point;
   transmitting a message to the device to indicate that the device should attempt to obtain network access through the access point on a different frequency band;
   transmitting a message to the device to indicate that network access can be provided but that quality of service is expected to be poor; or
   terminating the attachment of the device to the access point.

8. The method of claim 2, wherein the test frame is further configured to require the mirror response by:
   constructing the test frame as a unicast Action frame which is deliberately in syntactic error; and
   setting a most significant bit (MSB) of a Category field of the test frame to 0.

9. The method of claim 8, wherein constructing the test frame as a unicast Action frame which is deliberately in syntactic error comprises assigning the test frame a Category field which is undefined in a wireless communication protocol according to which the wireless network operates.

10. The method of claim 8, wherein determining that the test is passed when the mirror response corresponds to the test frame comprises confirming that a Category field of the mirror response has an MSB set to 1.

11. An access point configured to perform the method of claim 1.

12. A system comprising the access point of claim 11 and the device.

13. A non-transitory computer-readable storage medium storing a computer program comprising instructions which, when the computer program is executed by a computer, cause the computer to control operation of a wireless network access point of a wireless network by:
  wirelessly exchanging management frames with a device to attach the device to the access point in order to establish:
    a wireless downlink data communication channel from the access point to the device, and
    a wireless uplink data communication channel from the device to the access point responsive thereto, performing a test of the wireless link at a data link layer, the test including:
    transmitting a test frame to the device on the downlink channel, the test frame:
      having a length greater than each of the management frames,
      including a sequence of test data bits, and
      being configured to require a mirror response comprising the sequence of test data bits;
    monitoring for receipt of the mirror response on the uplink channel; and
    determining whether the test is passed or failed, wherein the test is only passed if the mirror response is received on the uplink channel.

14. A computer system comprising:
  at least one processor and memory configured to control operation of a wireless network access point of a wireless network by:
    wirelessly exchanging management frames with a device to attach the device to the access point in order to establish:
      a wireless downlink data communication channel from the access point to the device, and
      a wireless uplink data communication channel from the device to the access point
    responsive thereto, performing a test of the wireless link at a data link layer, the test including:
    transmitting a test frame to the device on the downlink channel, the test frame:
      having a length greater than each of the management frames,
      including a sequence of test data bits, and
      being configured to require a mirror response comprising the sequence of test data bits;
    monitoring for receipt of the mirror response on the uplink channel; and
    determining whether the test is passed or failed, wherein the test is only passed if the mirror response is received on the uplink channel.

* * * * *